United States Patent
Ku

(10) Patent No.: US 8,752,234 B2
(45) Date of Patent: Jun. 17, 2014

(54) WIPER CONNECTOR

(75) Inventor: Yuan-Chin Ku, New Taipei (TW)

(73) Assignee: Dongguan Hongyi Wiper Co., Ltd., Dong Guan, Guang Dong (CN)

( * ) Notice: Subject to any disclaimer, the term of this patent is extended or adjusted under 35 U.S.C. 154(b) by 0 days.

(21) Appl. No.: 13/615,591

(22) Filed: Sep. 14, 2012

(65) Prior Publication Data

US 2013/0133153 A1 May 30, 2013

Related U.S. Application Data

(60) Provisional application No. 61/563,784, filed on Nov. 27, 2011.

(51) Int. Cl.
*B60S 1/40* (2006.01)

(52) U.S. Cl.
USPC .............. 15/250.32; 15/250.43; 15/250.44; 15/250.351; 15/250.31; 15/250.361; 403/161; 403/162

(58) Field of Classification Search
USPC ............ 15/250.32, 250.43, 250.44, 250.351, 15/250.31, 250.361; 403/161, 162, 163
See application file for complete search history.

(56) References Cited

U.S. PATENT DOCUMENTS

| 7,207,082 B2 * | 4/2007 | Lee | 15/250.32 |
| 2008/0235896 A1 * | 10/2008 | Cheng | 15/250.201 |
| 2010/0050361 A1 * | 3/2010 | Chang et al. | 15/250.32 |
| 2010/0205763 A1 * | 8/2010 | Ku | 15/250.32 |
| 2011/0247166 A1 * | 10/2011 | Depondt et al. | 15/250.32 |
| 2012/0047673 A1 * | 3/2012 | Depondt | 15/250.32 |
| 2012/0144615 A1 * | 6/2012 | Song et al. | 15/250.32 |
| 2013/0007975 A1 * | 1/2013 | Wu | 15/250.31 |

FOREIGN PATENT DOCUMENTS

| DE | 10349637 A1 * | 6/2005 | B60S 1/40 |
| DE | 102009002764 | * 11/2010 | B60S 1/38 |

* cited by examiner

*Primary Examiner* — Monica Carter
*Assistant Examiner* — Michael Jennings
(74) *Attorney, Agent, or Firm* — Li & Cai Intellectual Property (USA) Office

(57) ABSTRACT

A wiper connector which includes a connector body and at least one retaining plate, where the connector body has at least one through structure, and one end of the elastic fin is defined as a fastening portion for establishing secure coupling with the connector body. The elastic fin has an opening formed thereon which correspondingly aligning the through structure so that an inserted bolt is retained in the connector body by the retaining plate. The wiper connector is applicable on all bolt-type wiper arms, therefore, fewer disturbances are brought to the users in selection of the wiper connectors. Furthermore, the wiper connector has a simple structure which can be assembled and dismantled easily, where other advantages includes a low damage rate, a high adaptability, and a significant reduce in the expense. Thus, overcoming disadvantages of conventional wiper connectors such as having a complex structure and a poor adaptability.

4 Claims, 21 Drawing Sheets

WIPER CONNECTOR

BACKGROUND OF THE INSTANT DISCLOSURE

1. Field of the Instant Disclosure

The instant disclosure relates to a wiper connector; in particular, to a universal wiper connector for accommodating different bolt-type wiper arms.

2. Description of Related Art

In recent years, the bolt-type wiper arms have been widely applied in modern cars, where typical bolt-type wiper arms usually have an engaging structure designed proximate to the bolt for connection to the wiper connector. Nevertheless, the bolt-type wiper arms from different manufacturers across the industry do not share an universal standard for their engaging structure design, and therefore, consumers have to consider if his/her current engaging structure is suitable before purchasing a new wiper blade. Thus, bringing disturbances to the consumers in selection of the products.

In order to be applicable on the various wiper products, high adaptability bolt-type wiper arms are being researched and invented. These bolt-type wiper arms usually have a stopping member arranged adjacently to the bolt, such that after the bolt is inserted into the wiper connector, the stopping member will prevent the wiper connector from detaching during operation. Good enough, such type of bolt-type wipers are applicable on nearly all insert-type wiper products. However, some cars have their particularly designed bolt-type wiper arms which do not have the aforementioned high adaptability. Thus, the designers have to research new adaptable wiper connectors to meet the demands where this has turned out to be economically inefficient.

SUMMARY OF THE INSTANT DISCLOSURE

The object of the instant disclosure is to provide a wiper connector for connection to a bolt-type wiper arm.

The instant disclosure provides a wiper connector which includes a connector body and at least one retaining plate. The connector body has at least one through structure for passingly receiving a bolt of the bolt-type wiper arm, and one end of the retaining plate is defined as a fastening portion for establishing secure coupling with the connector body. The retaining plate has an opening formed thereon correspondingly aligning the through structure so that an inserted bolt of the bolt-type wiper arm in the through structure is securely retained in the connector body by the retaining plate.

The instant disclosure provides a wiper connector which includes a connector body and a plurality of retaining members, where the connector body has a through structure formed therein for passingly receiving a bolt of the bolt-type wiper arm. Specifically speaking, the through structure is trench-like structure concavely formed on the top surface of the connector body. Each of the plurality of retaining members has an arched portion and two distal portions, and the two distal portions being securely mounted respectively on the connector body protruding from the through structure so that an inserted bolt of the bolt-type wiper arm in the through structure is securely retained in the connector body by the retaining member The instant disclosure has the following advantages: since the wiper connector of the instant disclosure is applicable on all bolt-type wiper arms, therefore, fewer disturbances will be brought to the users in selection of the wiper connectors. Furthermore, the wiper connector of the instant disclosure has advantages such as having a simple structure which can be assembled and dismantled easily, and also a low damage rate, a high adaptability, and a significant reduce in the expense. Thus, overcoming disadvantages of conventional wiper connectors such as having a complex structural design and a poor adaptability.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF THE PREFERRED EMBODIMENTS

Figure 1:
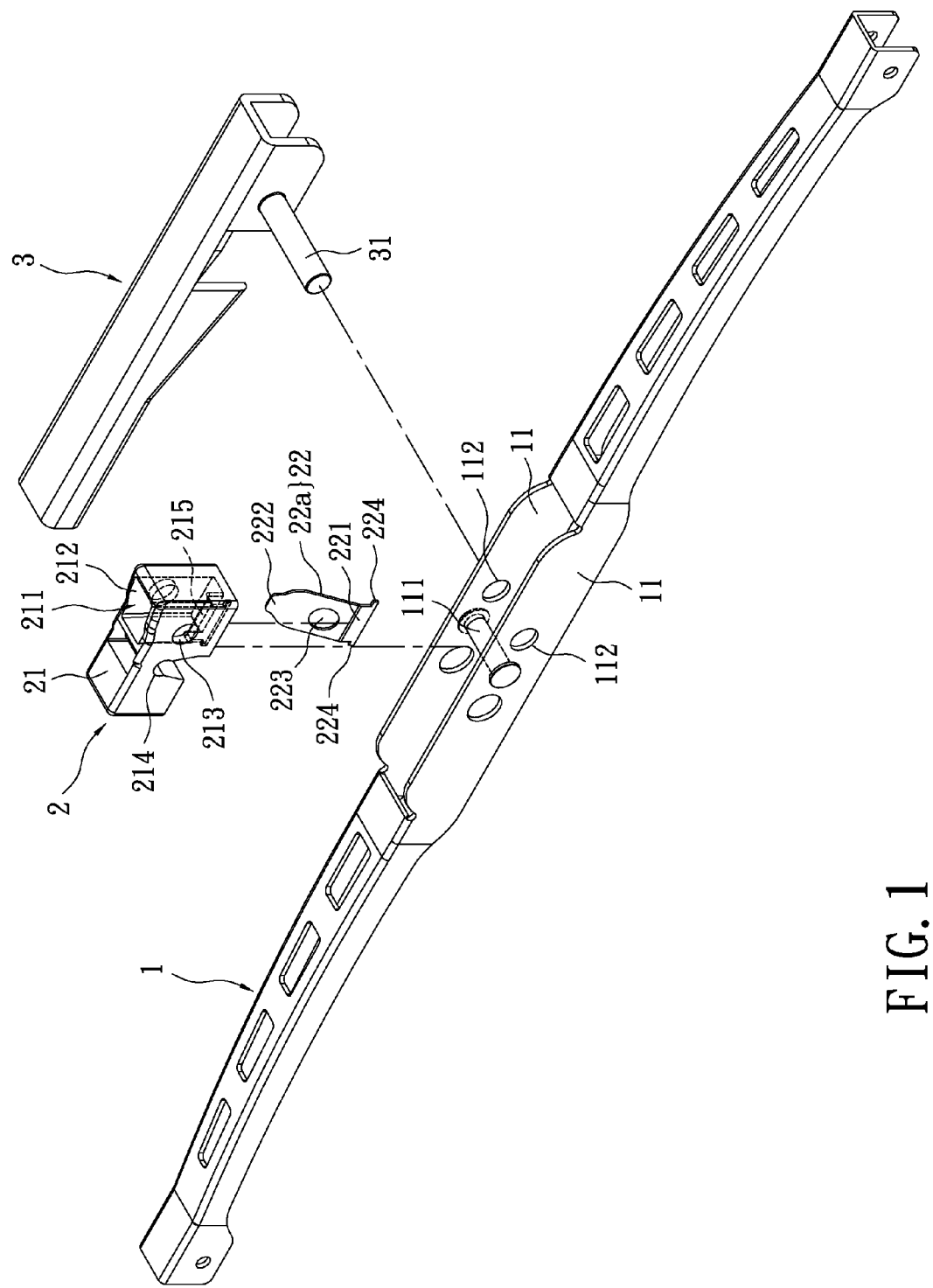
FIG. 1 shows an exploded view according to a first embodiment of the instant disclosure.
Figure 2:
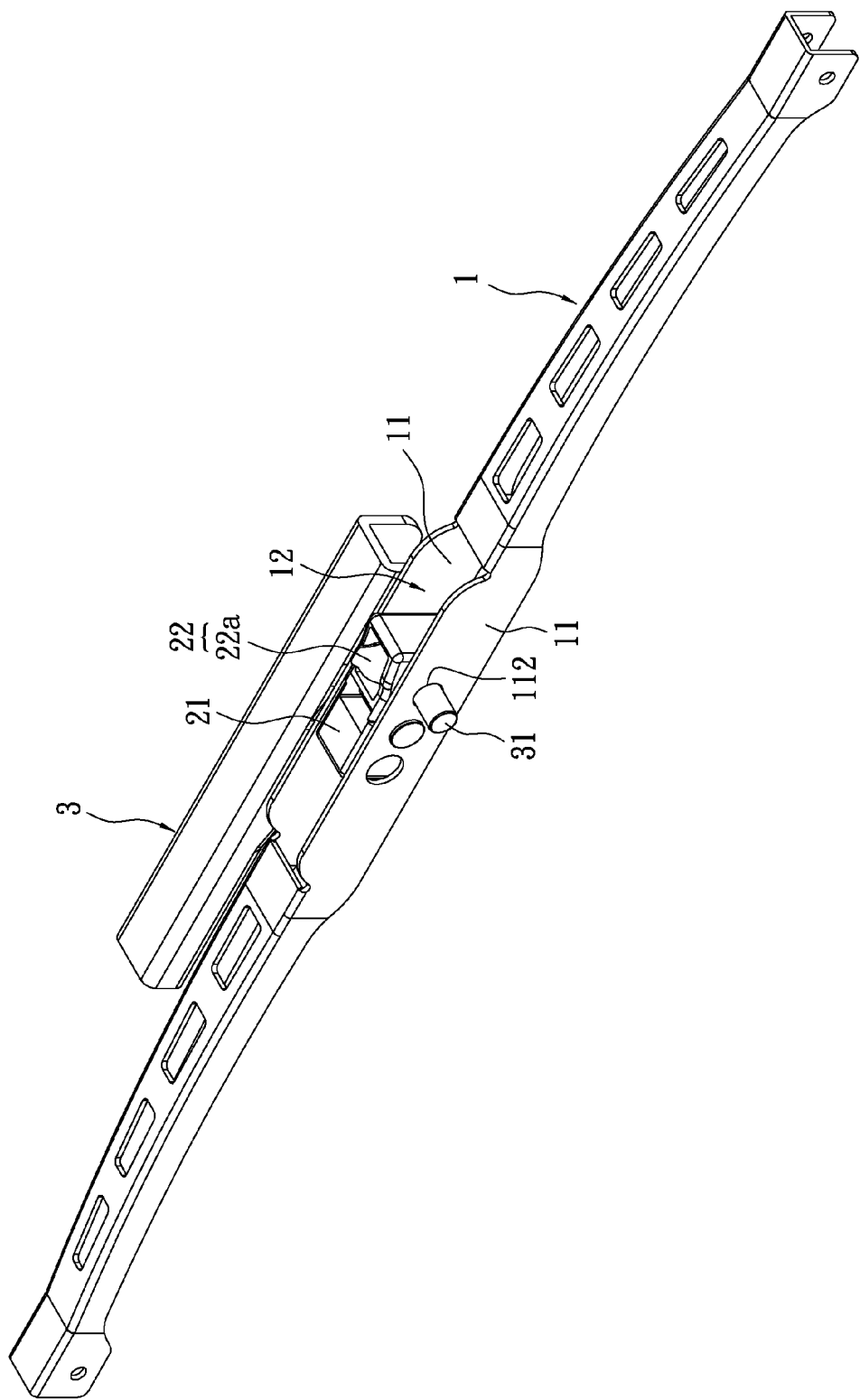
FIG. 2 shows an assembled view according to the first embodiment of the instant disclosure.

With reference to FIGS. 1-2, the instant disclosure provides a wiper connector 2 for accommodating a bolt-type wiper arm 3.

[The First Embodiment]

Figure 3:
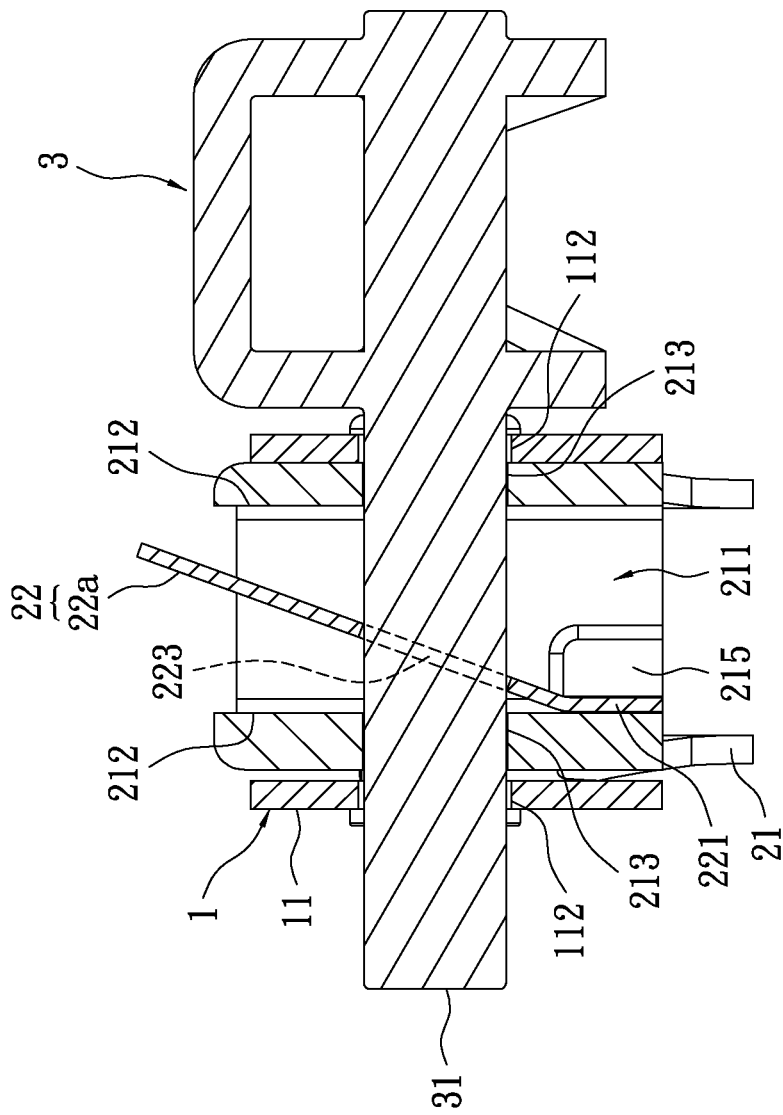
FIG. 3 shows a cross-sectional view according to the first embodiment of the instant disclosure.

Please refer to FIGS. 1-3, the wiper connector 2 of the instant disclosure is arranged in a wiper blade 1. The wiper blade 1 has two blade walls 11, two engaging holes 112 and a mounting seat 12, where the two engaging holes 112 are formed on the two respective blade walls 11, and the mounting seat 12 is defined between the two blade walls 11. The wiper connector 2 is accommodated within the mounting seat 12 of the wiper blade 1, and the wiper connector 2 includes a connector body 21 and a retaining plate 22.

Referring again to FIG. 1, the connector body 21 has a concaved portion 211, a retaining portion 214 and a stopping portion 215 (please refer to FIG. 3). The connector body 21 has two side walls 212 formed on the two respective sides of the concaved portion 211. Each of the two side walls 212 has a through structure 213 formed thereon, where the two through structures 213 share the same coaxial tube, and the two through structures 213 are through holes formed on the respective side walls 212. Furthermore, the retaining portion 214 is engaged to a rod 111 of the wiper blade 1.

Figure 4A:
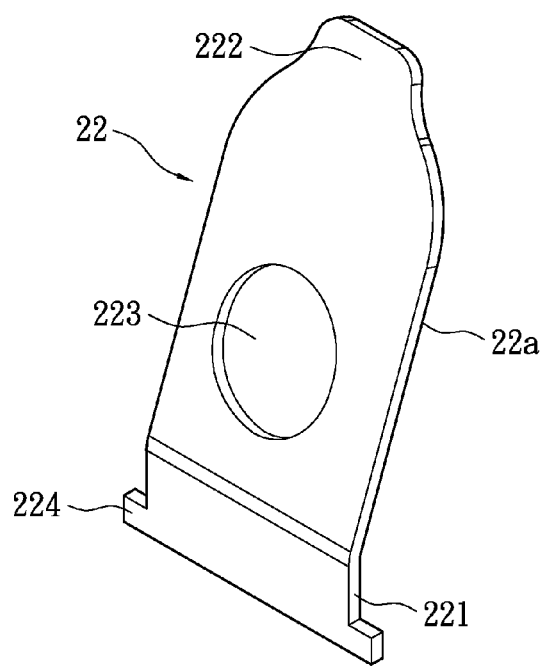
FIG. 4A shows a three-dimensional perspective view of a flexible plate according to the first embodiment of the instant disclosure.
Figure 4B:
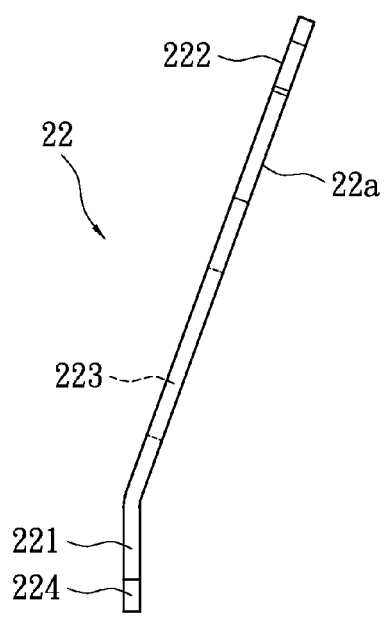
FIG. 4B shows a side view of the flexible plate according to the first embodiment of the instant disclosure.

With reference to FIGS. 4A-4B, the retaining plate 22 is a flexible plate 22a, where one end of the flexible plate 22a is defined as a fastening portion 221, where the fastening portion 221 extends to form an adjustable portion 222. The adjustable portion 222 has an opening 223 formed thereon, where the opening 223 is a through hole formed on the flexible plate 22a.

Referring again to FIGS. 1-3, the fastening portion 221 of the flexible plate 22a is mounted on the connector body 21. To provide further explanations, the concaved portion 211 has a stopping portion 215 formed therein, where the stopping portion 215 forms a gap with the one of the side walls 212. Furthermore, the fastening portion 221 of the flexible plate 22a is engaged in the gap.

The junction between the flexible plate 22a and the fastening portion 221 is bent in a certain angle such that the adjustable portion 222 will extend in a slant direction from the fastening portion 221, and thereby an obtuse angle will be formed between the adjustable portion 222 and the fastening portion 221. Each of the two sides (referring to the two sides on one end of the flexible plate 22a) of the fastening portion 221 has a protrusion 224 which prevents the flexible plate 22a from over-inserting into the gap. Specifically speaking, the obtuse angle formed between the fastening portion 221 and the adjustable portion 222 will enable the adjustable portion 222 to slant, such that the adjustable portion 222 will be blocked by the stopping portion 215. Furthermore, the two protrusions 224 of the fastening portion 221 will also be blocked within the gap. In this way, the fastening portion 221 will be engaged in the gap, such that the fastening portion 221 can be fixedly arranged in the concaved portion 211 for the flexible plate 22a to arrange stably in the concaved portion 211.

Figure 19A:
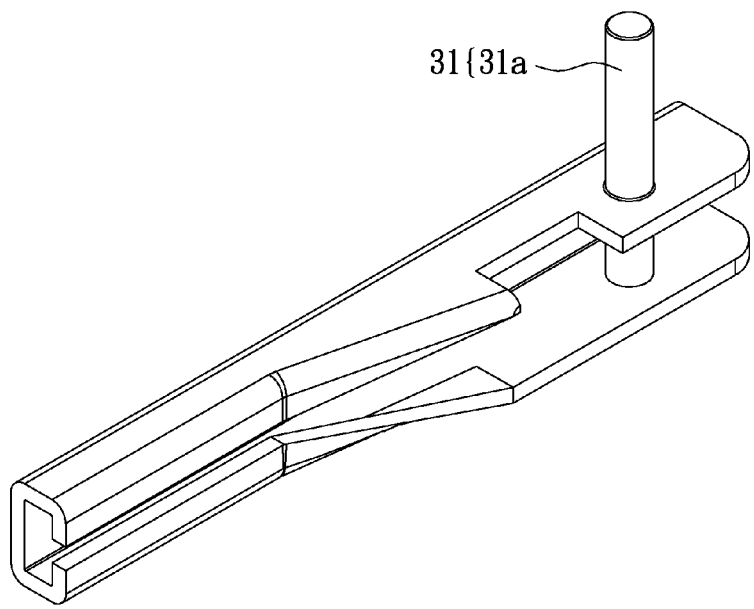
FIG. 19A shows a three-dimensional perspective view of a cylinder utilized in the instant disclosure.
Figure 19B:
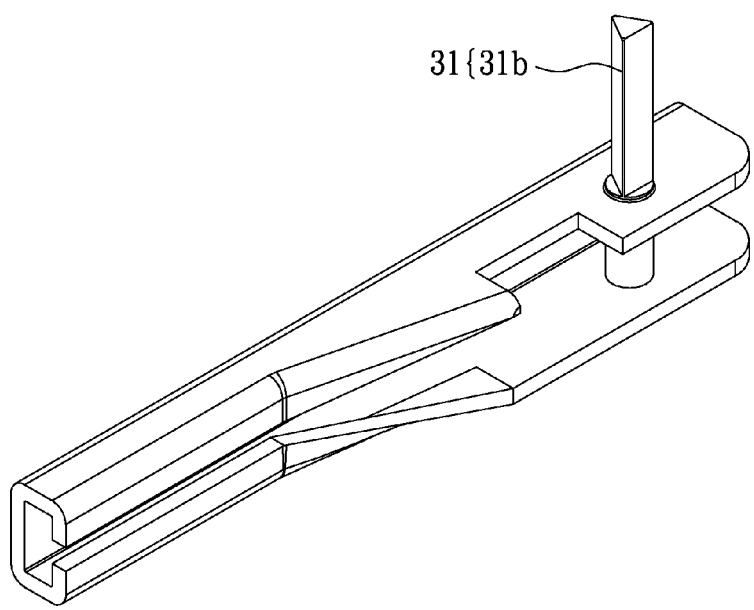
FIG. 19B shows a three-dimensional perspective view of a triangular prism utilized in the instant disclosure.
Figure 19C:
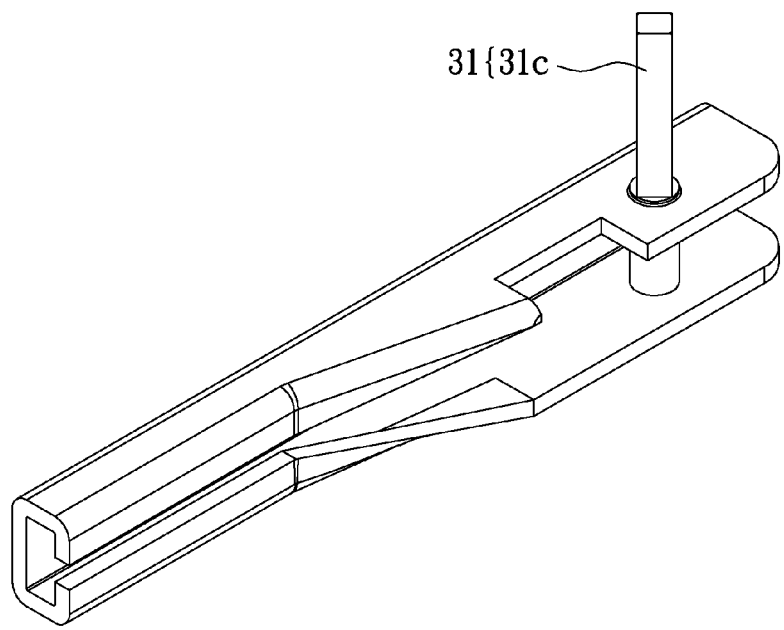
FIG. 19C shows a three-dimensional perspective view of a tetragonal prism utilized in the instant disclosure.
Figure 19D:
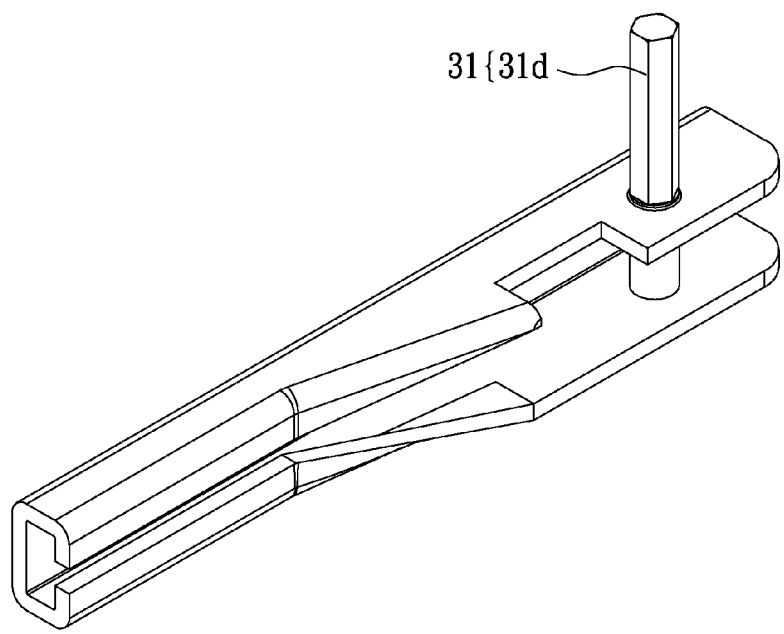
FIG. 19D shows a three-dimensional perspective view of a hexagonal prism utilized in the instant disclosure.
Figure 19E:
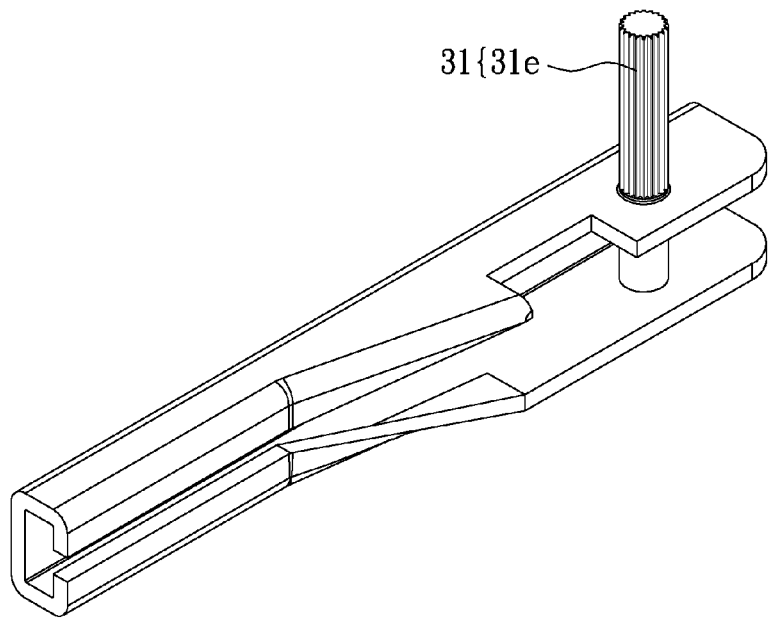
FIG. 19E shows a three-dimensional perspective view of a hexagonal prism utilized in the instant disclosure.
Figure 19F:
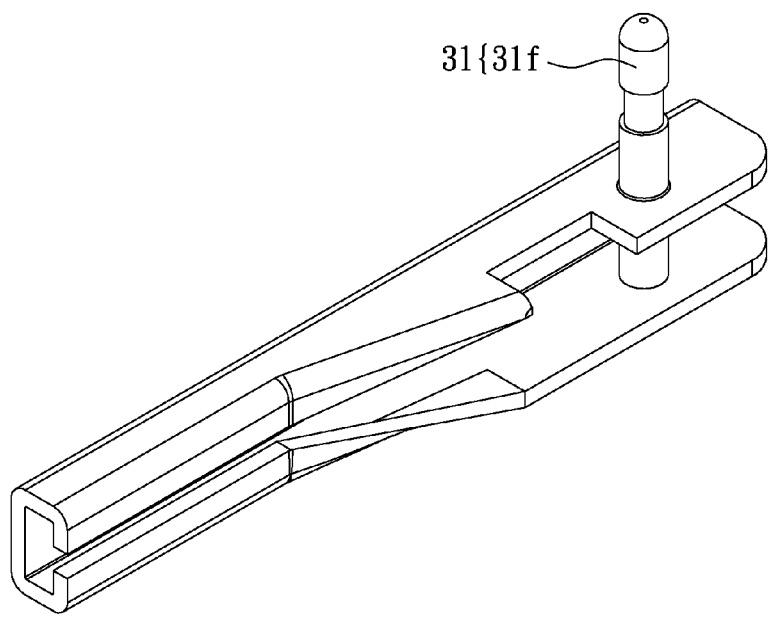
FIG. 19F shows a three-dimensional perspective view of an irregular-shaped prism utilized in the instant disclosure.

The opening 223 is formed on the flexible plate 22a, where the opening 223 is aligned in correspondence with the two through structures 213 of the two side walls 212. In other words, the opening 223 is arranged between the two through structures 213. Thus, when a bolt 31 of the bolt-type wiper arm 3 is inserted through the three holes, the bolt 31 will be inserted tightly into the opening 223 of the flexible plate 22a. To provide further explanations, when the wiper connector 2 and the wiper blade 1 are in assembly, the adjustable portion 222 is adjusted to bend the flexible plate 22a in a certain angle. Therefore, when the opening 223 of the flexible plate 22a is aligned with the two through structures 213 and also the two engaging holes 112 of the wiper blade 1, the bolt 31 can be inserted through the five holes concurrently. Next, adjust the adjustable portion 222 to bend the flexible plate 22a in another angle, such that the opening 223 is not in direct alignment with the two through structures 213 and the two engaging holes 112, the opening 223 will then abut tightly against the bolt 31. Thus, the connector 2 can be connected tightly to the bolt-type wiper arm 3. Furthermore, the bolt 31 can be selected from the group consisting of a cylinder 31a (FIG. 19A), a triangular prism 31b (FIG. 19B), a tetragonal prism 31c (FIG. 19C), a hexagonal prism 31d (FIG. 19D), a polygonal prism 31e (FIG. 19E), and an irregular-shaped prism 31f (FIG. 19F). The cross-sectional shape of the bolt 31 is not limited to the exemplary illustrations included herein.

The following description illustrates the assembling method of the wiper connector 2 to the bolt-type wiper arm 3.

Firstly, providing a wiper connector 2 which includes a connector body 21 and a flexible plate 22a.

Next, arranging the wiper connector 2 on a mounting seat 12 of the wiper blade 1, where a retaining portion 214 of the connector body 21 is engaged to a rod 111 in the mounting seat 12, and the two blade walls 11 of the wiper blade 1 abut against the two respective side walls 212 of the connector body 21 for the wiper connector 2 to dispose in the wiper blade 1, and the wiper connector 2 is adjusted to align the through structure 213 to the engaging holes 112.

Then, adjusting the adjustable portion 222 of the flexible plate 22a to a certain position within the concaved portion 211, such that the opening 223 of the flexible plate 22a, the two through structures 213 of the concaved portion 211 and the two engaging holes 112 of the wiper blade 1 will be in alignment.

Next, providing a bolt-type wiper arm 3, where the bolt-type wiper arm 3 has a bolt 31 which protrudes perpendicularly from an end portion thereof, the bolt 31 is inserted into the two through structures 213 of the wiper connector 2 and the opening 223. Specifically speaking, the bolt 31 also inserts through the two engaging holes 112 of the wiper blade 1, such that the wiper connector and the bolt-type wiper arm 3 are in connection.

Eventually, adjusting the adjustable portion 222 to bend the flexible plate 22a to another position, such that the opening 223 is not in direct alignment with the two through structures 213 and the two engaging holes 112, and thereby, the bolt 31 will be inserted tightly within the opening 223. Thus, the connector 2 can be connected tightly to the bolt-type wiper arm 3.

[The Second Embodiment]

Figure 5A:
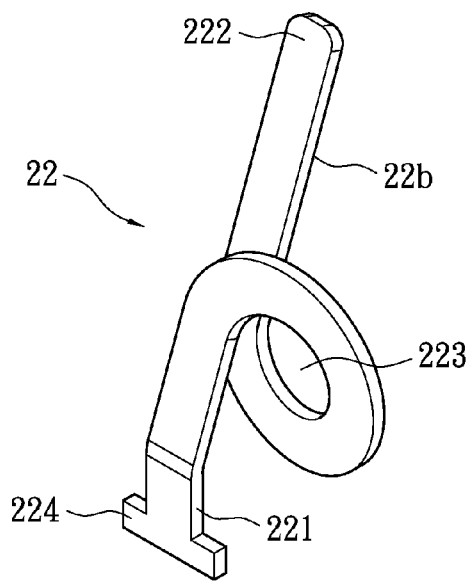
FIG. 5A shows a three-dimensional perspective view of a spiral plate according to a second embodiment of the instant disclosure.
Figure 5B:
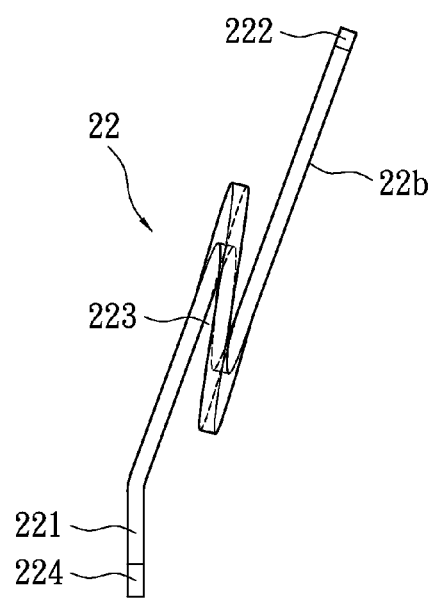
FIG. 5B shows a side view of the spiral plate according to the second embodiment of the instant disclosure.

With reference to FIGS. 5A-5B, the instant embodiment discloses a different retaining plate 22 in comparison to the preceding embodiment.

The retaining plate 22 is a spiral plate 22b, where one end of the spiral plate 22b is defined as a fastening portion 221, where the fastening portion 221 extends to form an adjustable portion 222. The adjustable portion 222 has an opening 223 formed thereon. The fastening portion 221 is mounted on the connector body 21 (shown in FIG. 3). In other words, the spiral plate 22b is disposed within the concaved portion 211.

With reference to FIG. 3, replace the flexible plate 22a with the spiral plate 22b. The opening 223 is defined in the spiral plate 22b, where the opening 223 corresponds to the two through structures 213 on the two side walls 212. In other words, the opening 223 is arranged between the two through structures 213. When the bolt 31 of the bolt-type wiper arm 3 is inserted through the three holes, the bolt 31 will be inserted tightly into the opening 223 of the flexible plate 22a. To provide further explanations, after the wiper connector 2 and the wiper blade 1 are in assembly, adjust the adjustable portion 222 to bend the spiral plate 22b in a certain angle. Therefore, when the opening 223 of the spiral plate 22b is aligned with the two through structures 213, and also the two engaging holes 112 of the wiper blade 1, the bolt 31 can be inserted through the five holes concurrently. Next, adjust the adjustable portion 222 to bend the spiral plate 22b in another angle, such that the opening 223 is not in direct alignment with the two through structures 213 and the two engaging holes 112, the opening 223 will then abut tightly against the bolt 31. Thus, the connector 2 can be connected tightly to the bolt-type wiper arm 3. Furthermore, the bolt 31 can be selected from the group consisting of a cylinder 31a (FIG. 19A), a triangular prism 31b (FIG. 19B), a tetragonal prism 31c (FIG. 19C), a hexagonal prism 31d (FIG. 19D), a polygonal prism 31e (FIG. 19E), and an irregular-shaped prism 31f (FIG. 19F), as long as the bolt 31 can be connected to the bolt-type wiper arm 3.

Since the assembling method of the wiper connector 2 and the bolt-type wiper arm 3 described in the instant embodiment is identical to that of the preceding embodiment, no further explanations shall be provided herein.

[The Third Embodiment]

The difference between the instant embodiment and the preceding two embodiments is the change of the structural design of the connector body and the retaining plate.

Figure 6:
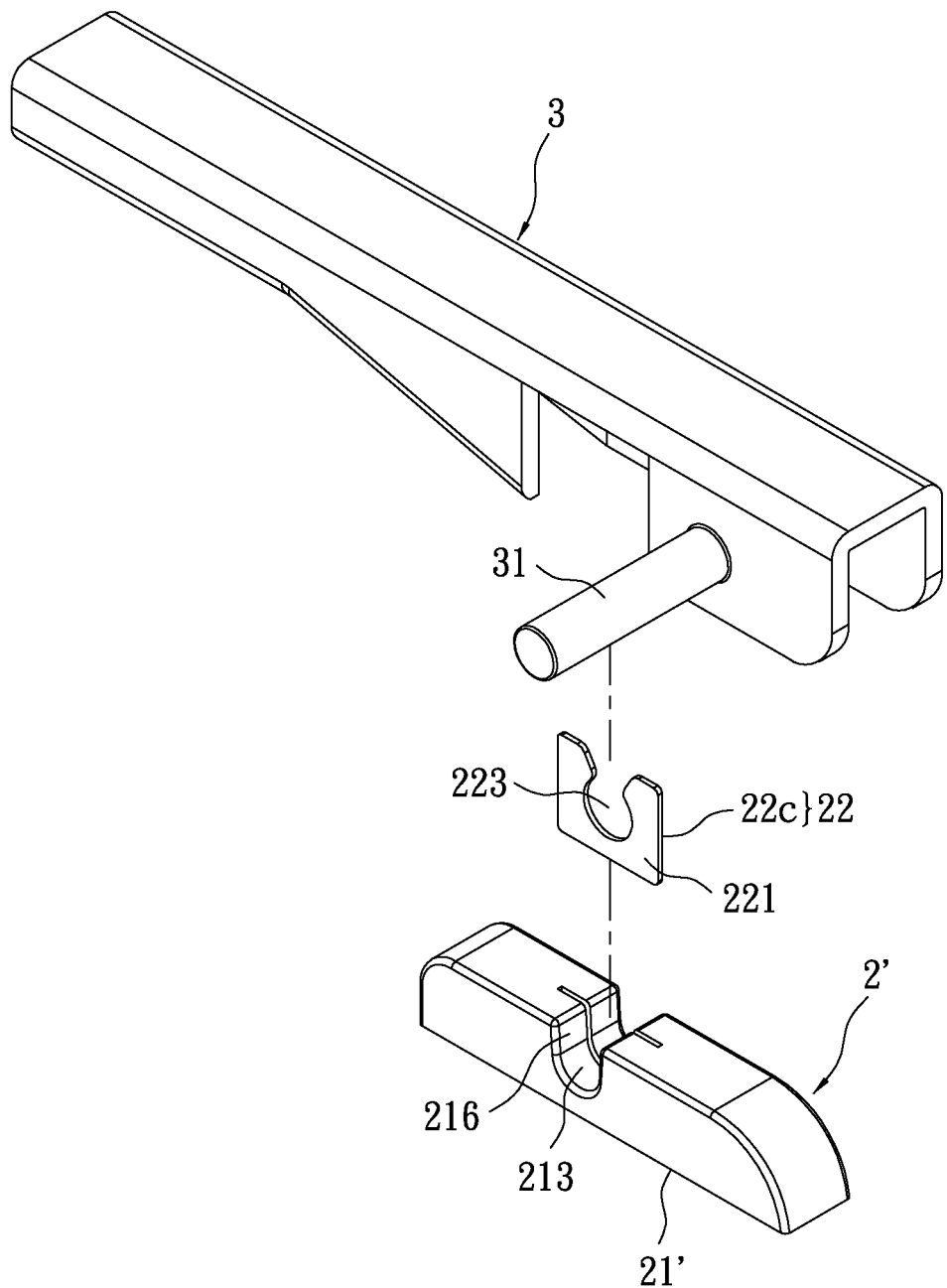
FIG. 6 shows an exploded view according to a third embodiment of the instant disclosure.
Figure 7:
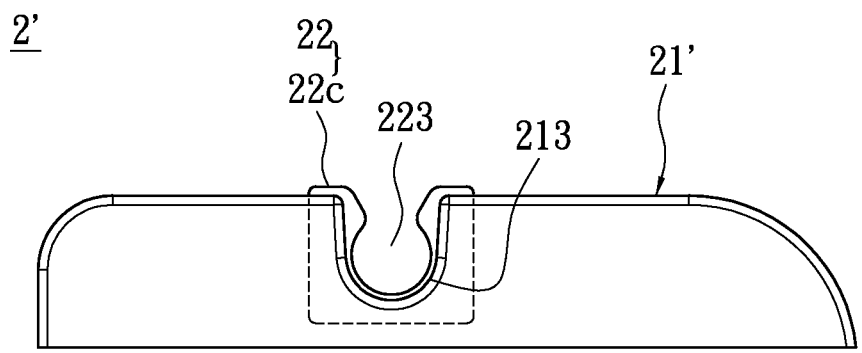
FIG. 7 shows a side view of the wiper connector according to the third embodiment of the instant disclosure.
Figure 8:
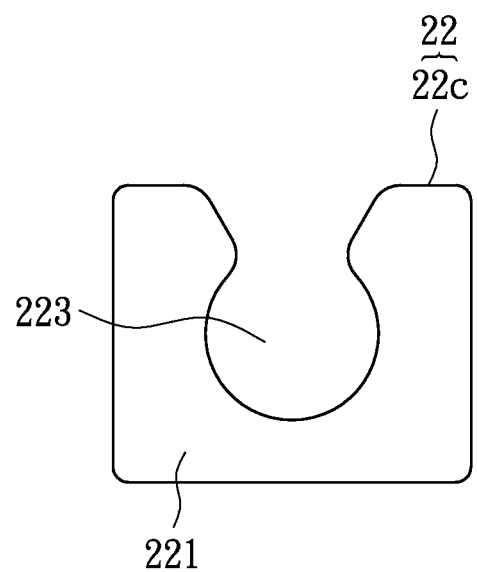
FIG. 8 shows a side view of a C-shaped retaining plate according to the third embodiment of the instant disclosure.

With reference to FIGS. 6-8, the wiper connector 2' of the instant embodiment includes a connector body 21', where the connector body 21' includes a through structure 213. The through structure 213 is a trench-like structure concavely formed on the top surface of the connector body 21'. The retaining plate 22 includes at least one C-shaped retaining plate 22c, where one end of the C-shaped retaining plate 22c is defined as a fastening portion 221, and an opening 223 is defined in the C-shaped retaining plate 22c. The fastening portion 221 of the C-shaped retaining plate 22c is mounted on the connector body 21', and the opening 223 corresponds to the through structure 213 of the connector body 21', where the diameter of the opening 223 is slightly smaller than that of the through structure 213.

When the bolt 31 of the bolt-type wiper arm 3 and the wiper connector 2 are in assembly, the opening 223 of the C-shaped retaining plate 22c will be forced to expand slightly larger, and thereby, the C-shaped retaining plate 22c will exert a force in return to abut against the bolt 31, such that wiper connector 2' can connect firmly to the bolt-type wiper arm 3. Furthermore, the bolt 31 can be selected from the group consisting of a cylinder 31a (FIG. 19A), a triangular prism 31b (FIG. 19B), a tetragonal prism 31c (FIG. 19C), a hexagonal prism 31d (FIG. 19D), a polygonal prism 31e (FIG. 19E), and an irregular-shaped prism 31f (FIG. 19F), as long as the diameter of the bolt 31 is slightly greater than that of the opening 223.

The following description illustrates the assembling method of the wiper connector 2' and the bolt-type wiper arm 3.

Firstly, providing a wiper connector 2' which includes a connector body 21' with at least one C-shaped retaining plate 22c mounted thereon.

Next, providing a bolt-type wiper arm 3, where the bolt-type wiper arm 3 has a bolt 31 which protrudes perpendicularly from an end portion thereof. During assembly, the bolt 31 is disposed downwards into the through structure 213 from the top surface of the connector body 21. Therefore, the C-shaped retaining plate 22c will be forced to expand to receive the bolt 31. In return, the elastic nature of the C-shaped retaining plate 22c will exert a force on the bolt 31 to clutch the bolt 31 tightly. Hence, the bolt 31 can be prevented from detaching from the wiper connector 2' for the wiper connector 2' to be connected tightly to the bolt-type wiper arm 3.

[The Fourth Embodiment]

Figure 9:
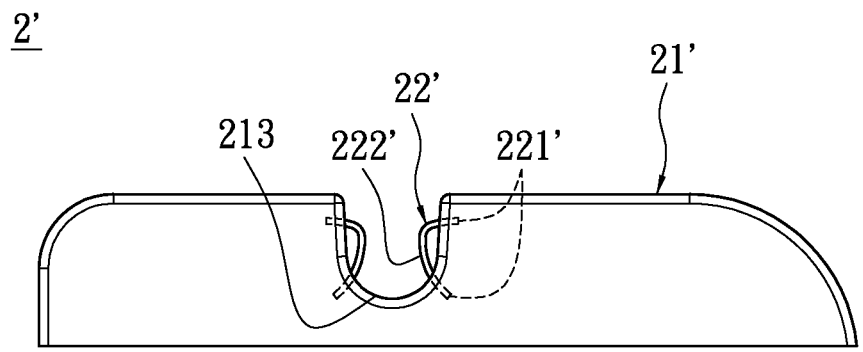
FIG. 9 shows a side view of the wiper connector according to a fourth embodiment of the instant disclosure.
Figure 10:
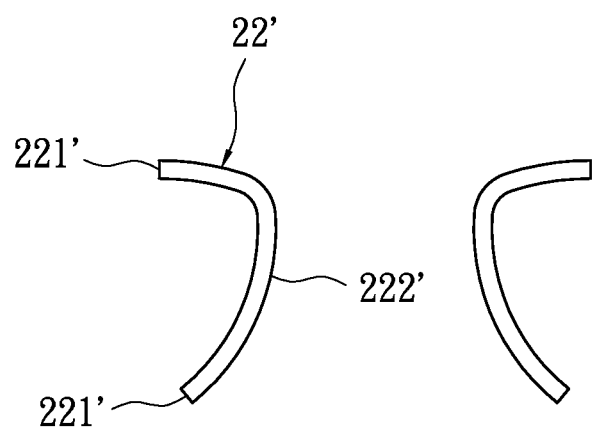
FIG. 10 shows a side view of the C-shaped retaining plate according to the fourth embodiment of the instant disclosure.
Figure 11:
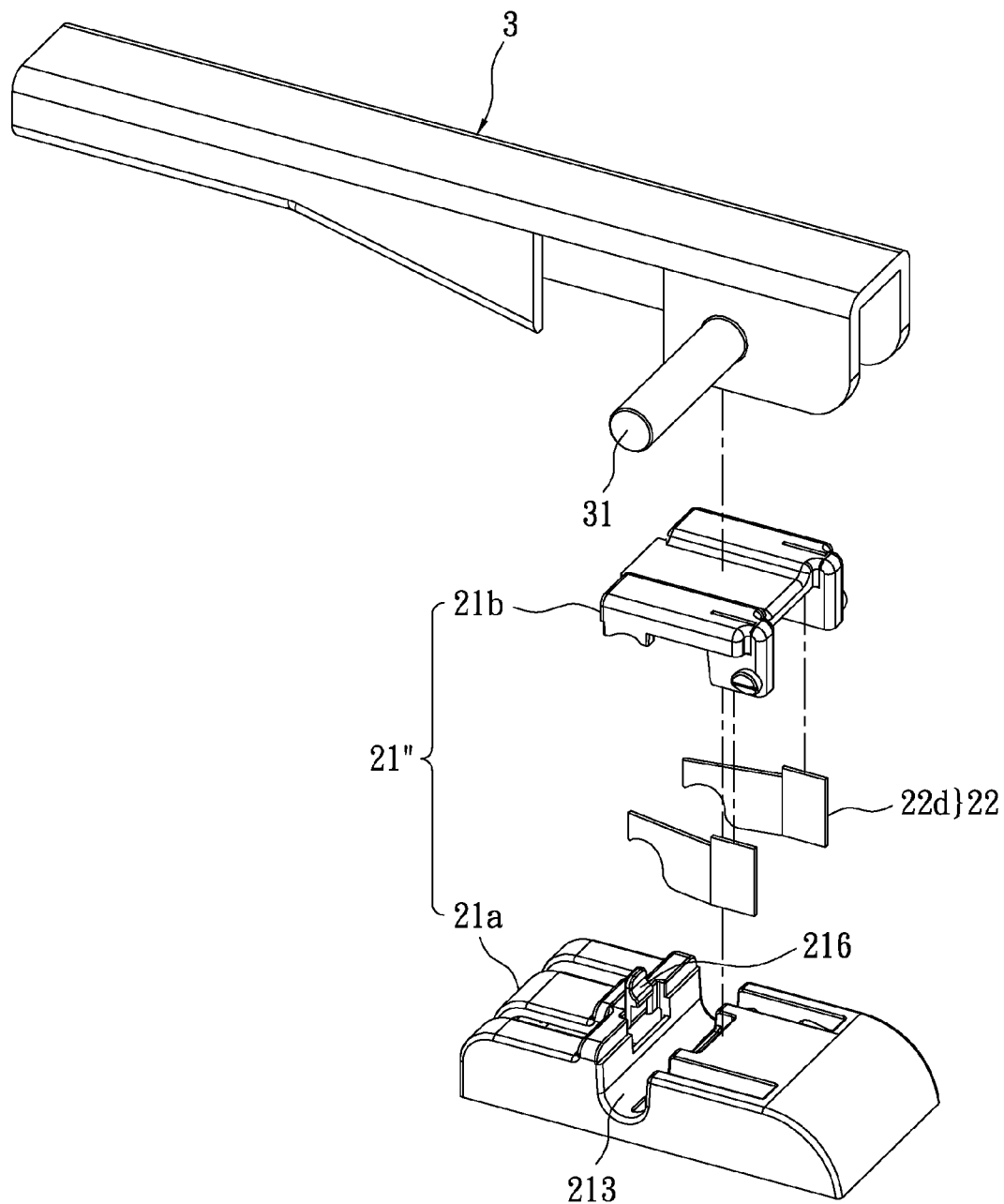
FIG. 11 shows an exploded view according to a fifth embodiment of the instant disclosure.

With reference to FIGS. 9-10, a plurality of retaining members 22' is provided in the instant embodiment which differs from the C-shaped retaining plate 22c as described in the third embodiment. The plurality of retaining members 22' is assembled to the same connector body 21' as described in the third embodiment. The features of the retaining member 22' are described as followed.

Each of the retaining members 22' has an arched portion 222' and two fastening portions 221'. The plurality of retaining members 22' is mounted within the through structure 213 of the connector body 21'. Specifically speaking, the two fastening portion 221' of each retaining member 22' are mounted on the connector body 21', where the arched portions 222' of the retaining members 22' protrude from the through structure 213 (shown in FIG. 6).

Referring again to FIG. 6, replace the C-shaped retaining plate 22c' with the plurality of retaining members 22' disclosed in the instant embodiment. When the bolt 31 of the bolt-type wiper arm 3 is assembled to the wiper connector 2', the arched portion 222' of the retaining member 22' will be depressed by the bolt 31, and in return, the arched portion 222' will exert a force on the surface of the bolt 31. Therefore, the wiper connector 2' can be connected to the bolt-type wiper arm 3. Furthermore, the bolt 31 can be selected from the group consisting of a cylinder 31a (FIG. 19A), a triangular prism 31b (FIG. 19B), a tetragonal prism 31c (FIG. 19C), a hexagonal prism 31d (FIG. 19D), a polygonal prism 31e (FIG. 19E), or an irregular-shaped prism 31f (FIG. 19F), as long as the diameter of the bolt 31 is greater than that of the arched portion 222'.

Since the assembling method of the wiper connector 2 and the bolt-type wiper arm 3 described in the instant embodiment is identical to what is described in the preceding embodiment, no further explanations shall be provided herein.

[The Fifth Embodiment]

The instant embodiment further provides a wiper connector which distinguishes from the aforementioned embodiments.

Please refer to FIGS. 11, 12, 13A-B. The bolt 31 of the bolt-type wiper arm 3 provided in the instant embodiment corresponds to the through structure 213 of the wiper connector 2".

The wiper connector 2" includes a connector body 21" and two retaining plates 22, where the connector body 21" includes a first connecting member 21a and a second connecting member 21b. The two retaining plates 22 are reed plates 22d which are disposed on a second connecting member 21b through a fastening portion 221 (shown in FIG. 14).

Figure 12:
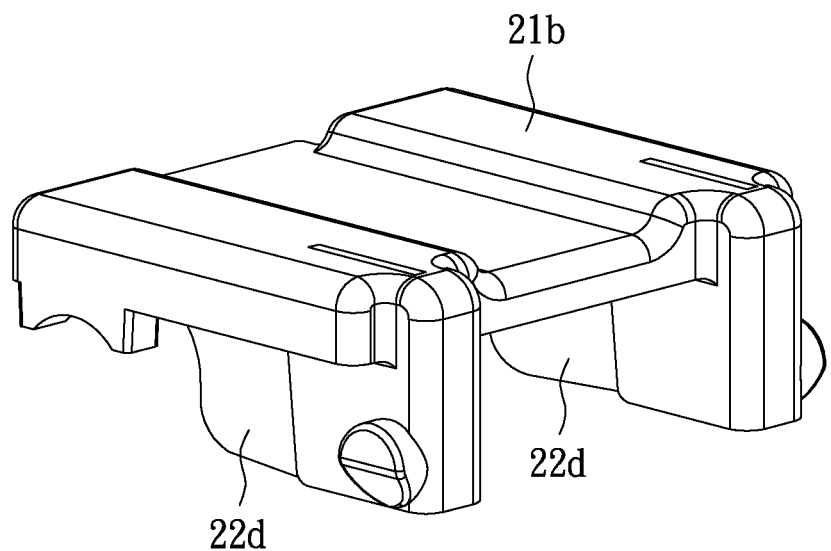
FIG. 12 shows an assembled perspective view of a reed plate and a second connective member according to the fifth embodiment of the instant disclosure.
Figure 13A:
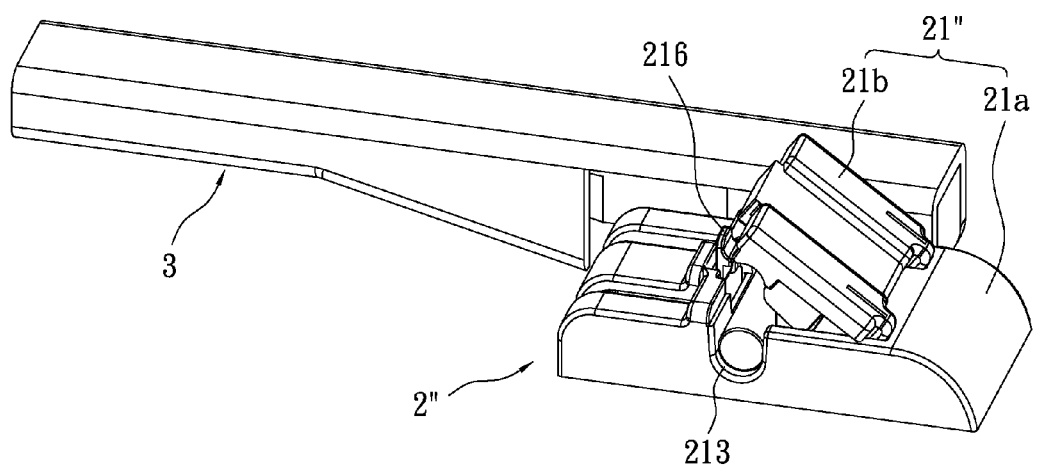
FIG. 13A shows a perspective view of the fifth embodiment of the instant disclosure under the opened condition.
Figure 13B:
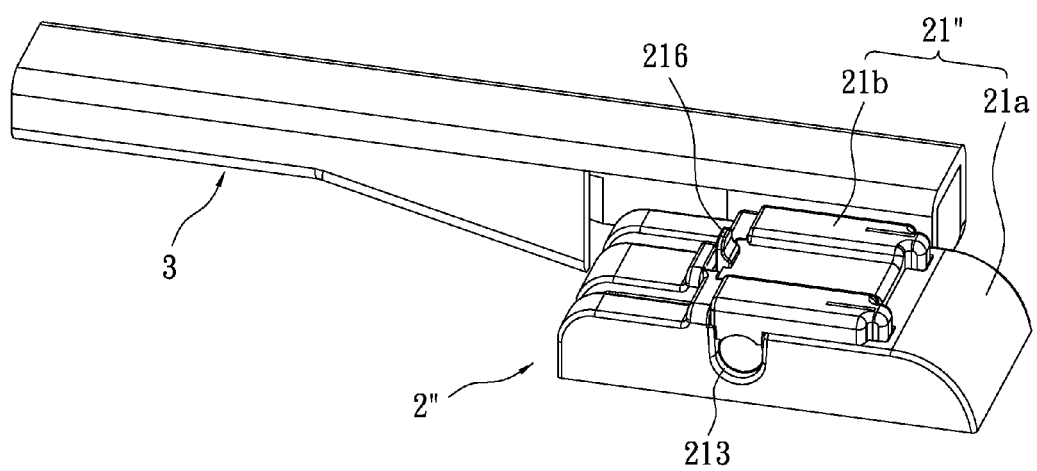
FIG. 13B shows a perspective view of the fifth embodiment of the instant disclosure under the closed condition.
Figure 14:
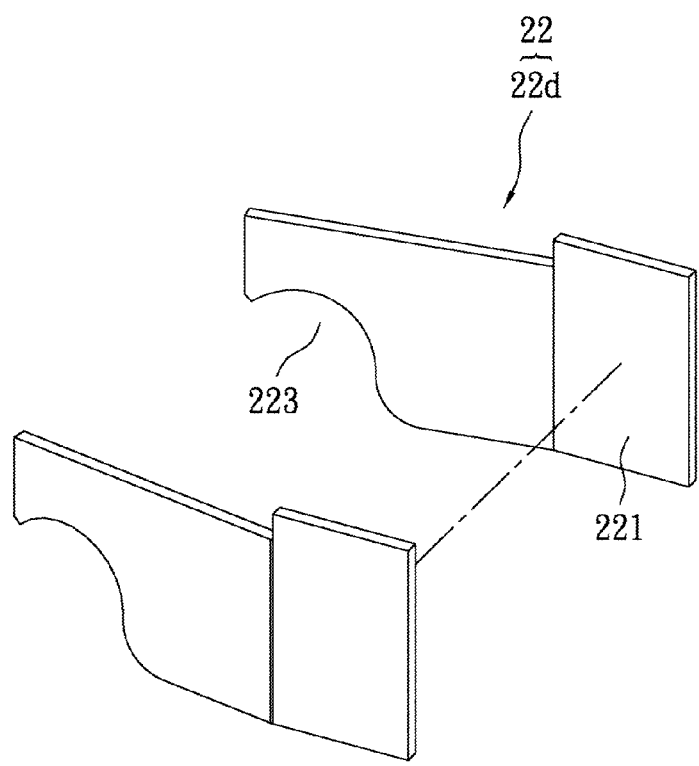
FIG. 14 shows a three-dimensional perspective view of the reed plate according to the fifth embodiment of the instant disclosure.

The first connecting member 21a has a through structure 213, where the through structure 213 is a trench-like structure concavely formed on a top surface of the first connecting member 21a. The second connecting member 21b is disposed on the first connecting member 21a which covers the through structure 213. With reference to FIG. 13A, one end portion of the second connecting member 21b is an axial axis which enables the through structure 213 to be movably opened for receiving, therefore, the bolt 31 can be disposed within the through structure 213 from the vertical direction. With reference to FIG. 13B, the second connecting member 21b is rotated to encase the through structure 213. A clutching portion 216 of the first connecting member 21a will be engaged to the second connecting member 21b to maintain the second connecting member 21b covering the through structure 213. With reference to FIGS. 12, 13B and 14, as the two reed plates 22d are affixed to the second connecting member 21b, therefore the opening 223 on the edge of the two reed plates 22d can abut against the surface of the bolt 31. Hence, the wiper connector 2" can be connected to the bolt-type wiper arm 3.

The instant embodiment takes two reed plates 22d for example, however this is not restricted thereto.

[The Sixth Embodiment]

A difference between the main bodies provided in the instant embodiment from that of the fifth embodiment is the arrangement of the first and the second connecting members.

With reference to FIGS. 15, 16, 17A and 17B, the bolt 31 of the bolt-type wiper arm 3 provided in the instant embodiment corresponds to the through structure 213 of the wiper connector 2".

Figure 18:
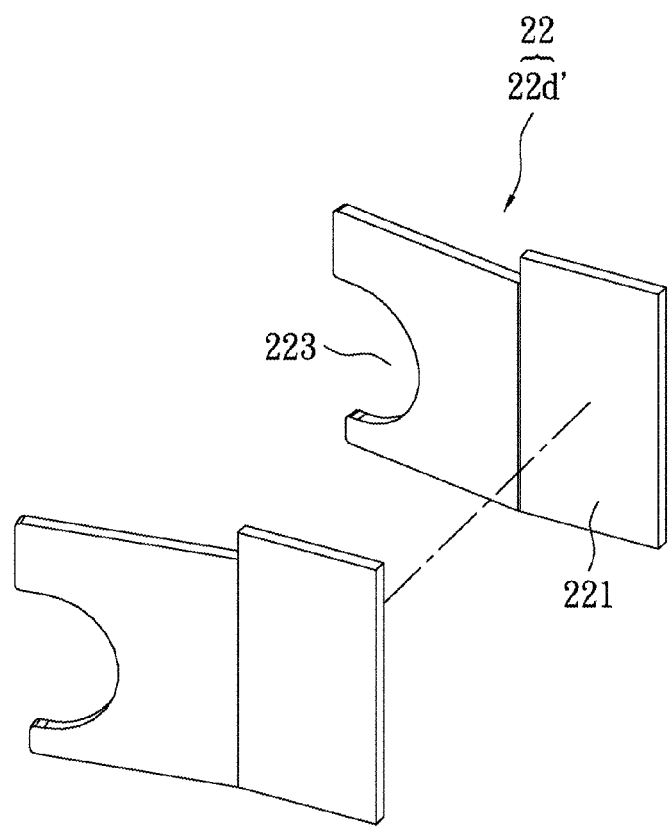
FIG. 18 shows a three-dimensional perspective view of the reed plate according to the sixth embodiment of the instant disclosure.

The wiper connector 2'" includes a connector body 21' and two retaining plates 22, where the connector body 21'" includes a first connecting member 21a' and a second connecting member 21b'. The two retaining plates 22 are reed plates 22d' which are disposed on a second connecting member 21b' through a fastening portion 221 (shown in FIG. 18).

Figure 15:
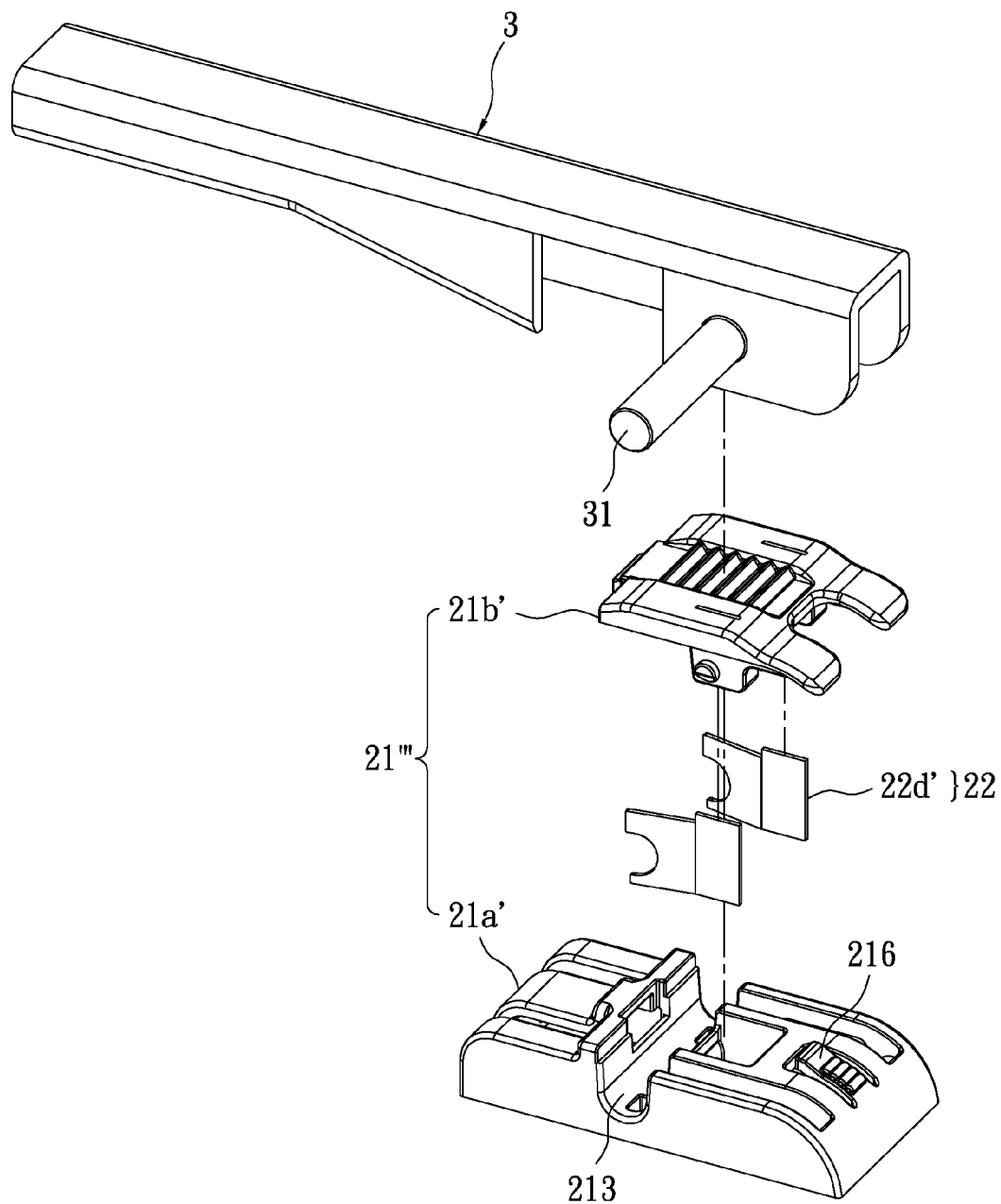
FIG. 15 shows an exploded view according to a sixth embodiment of the instant disclosure.
Figure 16:
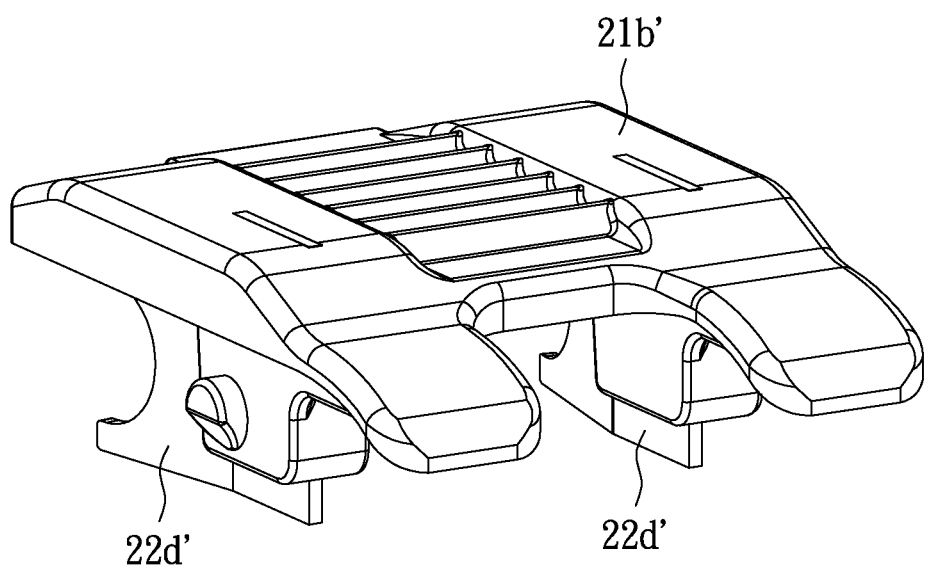
FIG. 16 shows an assembled perspective view of a reed plate and a second connective member according to the sixth embodiment of the instant disclosure.
Figure 17A:
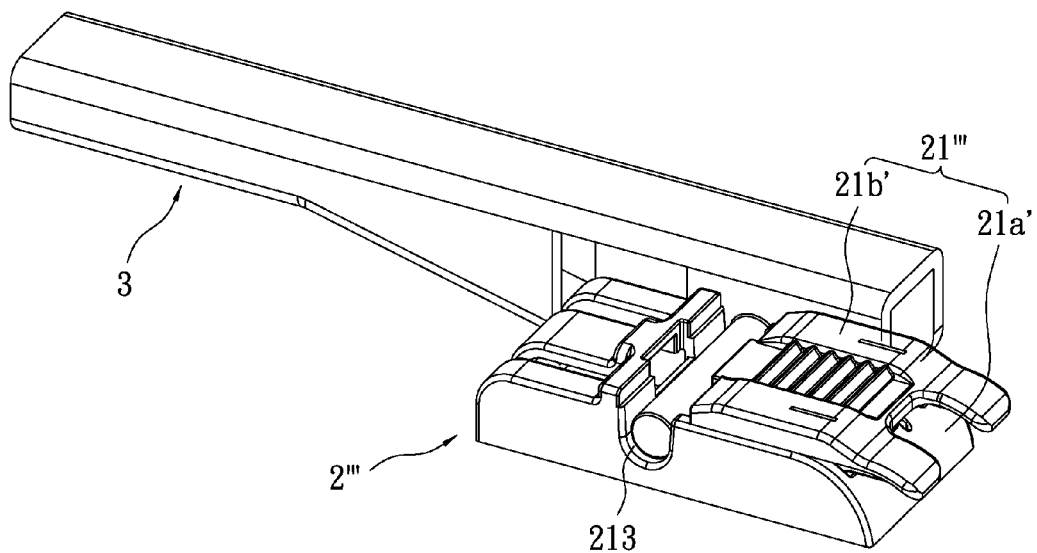
FIG. 17A shows a perspective view of the sixth embodiment of the instant disclosure under the opened condition.
Figure 17B:
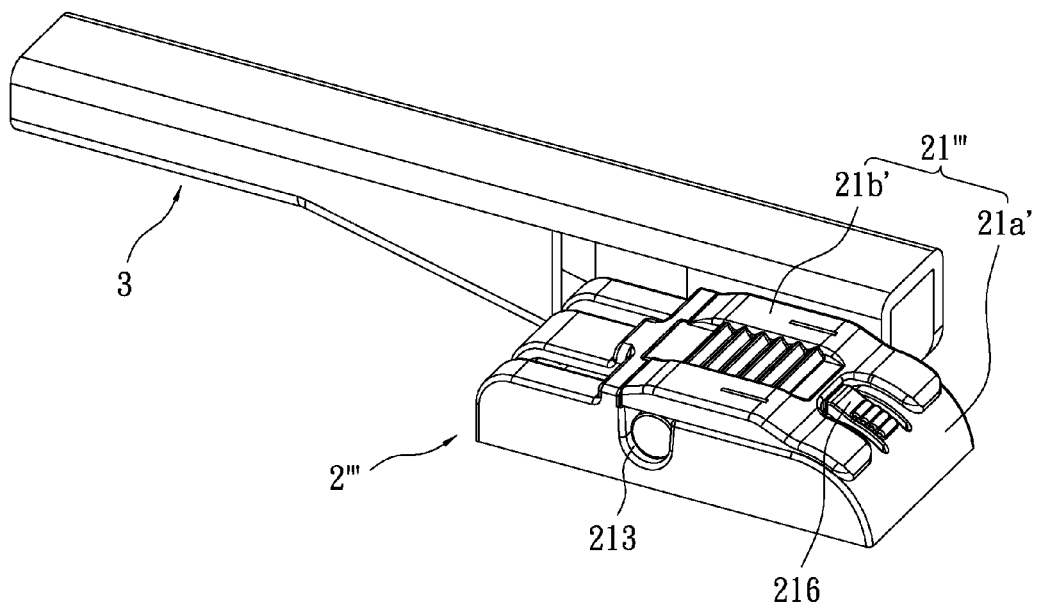
FIG. 17B shows a perspective view of the sixth embodiment of the instant disclosure under the closed condition.

Shown in FIGS. 15 and 17A, the second connecting member 21b' can be movably arranged on the top surface of the first connecting member 21a' to open the through structure 213 for receiving, therefore, the bolt 31 can be disposed within the through structure 213 from the vertical direction. With reference to FIG. 17B, the second connecting member 21b' is slid to encase the through structure 213. The first connecting member 21a' has a clutching portion 216 which will be engaged to the second connecting member 21b' to maintain the second connecting member 21b' encasing the through structure 213. With reference to FIGS. 15, 16, 17B and 18, as the two reed plates 22d' are affixed to the second connecting member 21b', therefore the opening 223 on the edge of the two reed plates 22d' can abut against the surface of the bolt 31. Hence, enabling the wiper connector 2'" to be connected to the bolt-type wiper arm 3.

[The Seventh Embodiment]

Figure 20A:
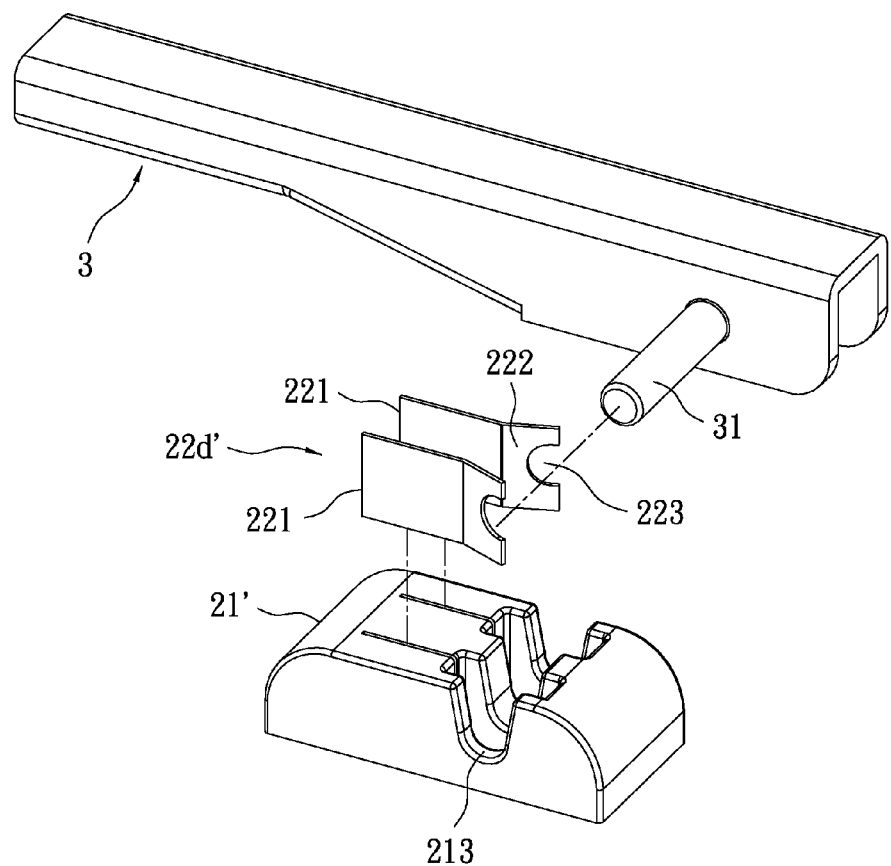
FIG. 20A shows an exploded view according to a seventh embodiment of the instant disclosure.
Figure 20B:
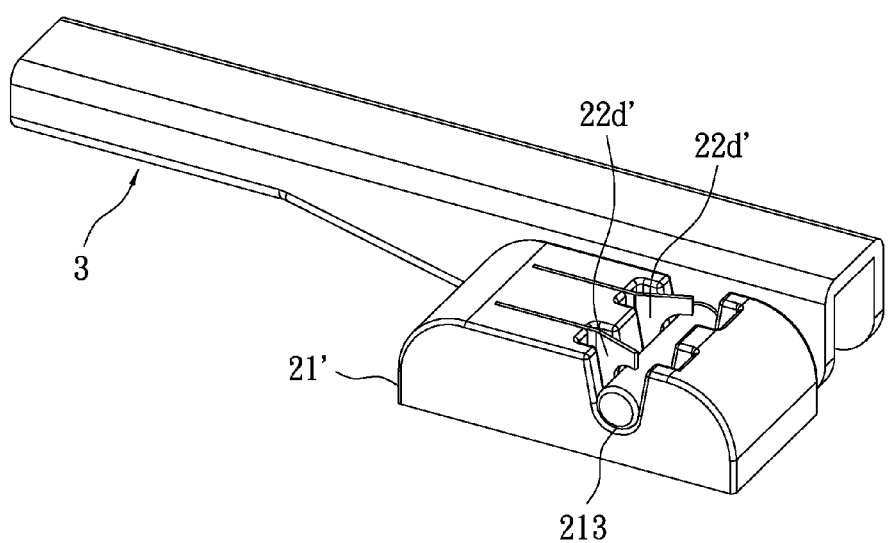
FIG. 20B shows an assembled view according to the seventh embodiment of the instant disclosure.

Please refer to FIGS. 20A-B, the connector body 21' has a trench-like through structure 213 concavely formed thereon. The two reed plates 22d' are mounted on the connector body 21' through the fastening portions 221, and the adjustable portion 222 of the two reed plates 22d' and the opening 223 are arranged within the through structure 213.

After the two reed plates 22d' are affixed to the connector body 21', the adjustable portion 222 is adjusted to arranged the two reed plates 22d' in a substantially parallel manner. Next, insert the bolt-type wiper arm 3 for the bolt 31 to penetrate through the two openings 223. Then, release the adjustable portion 222 for the two reed plates 22d' to return into the original bending position, such that bolt 31 of the bolt-type wiper arm 3 can be fastened tightly within the opening 223.

The instant embodiment takes two reed plates 22d' for example, however this is not restricted thereto.

[The Eighth Embodiment]

Figure 21A:
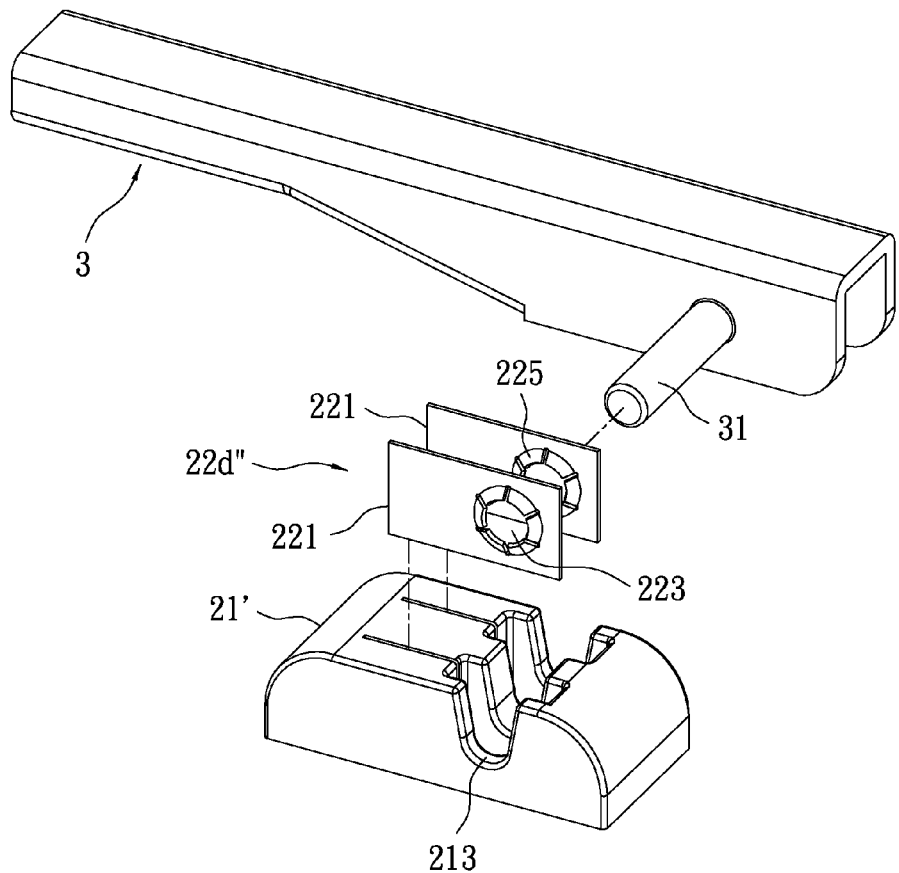
FIG. 21A shows an exploded view according to a eighth embodiment of the instant disclosure.
Figure 21B:
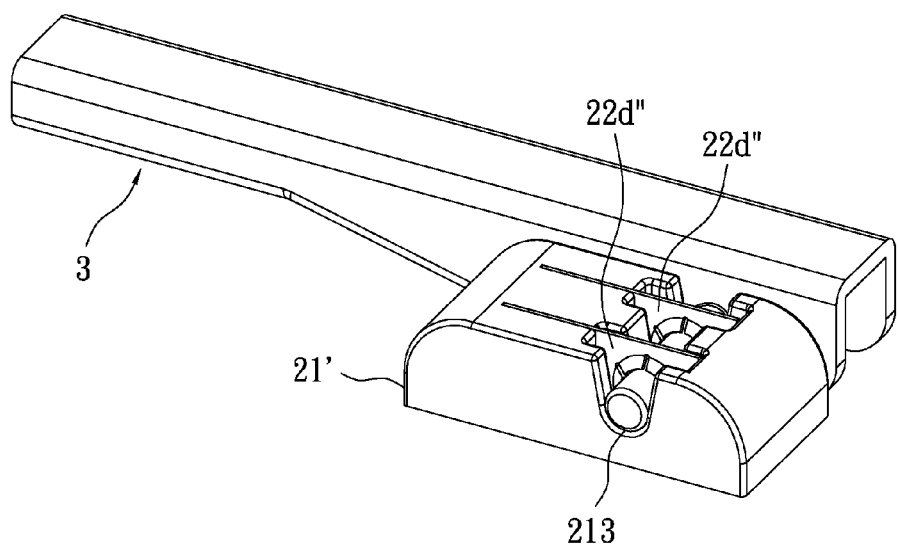
FIG. 21B shows an assembled view according to the eighth embodiment of the instant disclosure.

Please refer to FIGS. 21A-B, the connector body 21' has a trench-like through structure 213 concavely formed thereon. The two reed plates 22d'" are mounted respectively on the connector body 21' through a fastening portion 221. The two reed plates 22d' have a plurality of petals 225 formed therein, where the petals 225 are surroundingly arranged around the opening 223, and the petals 225 are accommodated in the through structure 213.

After the two reed plates 22d'" are affixed to the connector body 21', penetrate the bolt 31 through the two openings 223. As the diameter of the bolt 31 is greater than that of the openings 223, the petals 225 surrounding the openings 223 will be forced to expand, such that the openings 223 will be widened to receive the bolt 31. In return, the petals 225 will abut tightly against the bolt 31 to fasten the bolt-type wiper arm 3.

The instant embodiment takes two reed plates 22d'" for example, however this is not restricted thereto.

[The Possible Effects of the Instant Disclosure]

Based on the above, since the wiper connector of the instant disclosure is applicable on all bolt-type wiper arms, therefore, fewer disturbances will be brought to the users in selection of the wiper connectors. Furthermore, the wiper connector of the instant disclosure has advantages such as having a simple structure which can be assembled and dismantled easily, also a low damage rate, a high adaptability, and a significant reduce in the expense. Thus, overcoming disadvantages of conventional wiper connectors such as having a complex structural design with a poor adaptability.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims

What is claimed is:

1. A wiper connector for bolt-type wiper arm, comprising:
    a connector body having a through structure, a concaved portion and a stopping portion formed within the concaved portion, wherein the connector body includes two opposite side walls, the through structure is formed on each of the side walls, the stopping portion extends from one side wall toward the other side wall, and a gap is formed between the stopping portion and one of the side walls; and
    at least one retaining plate having a fastening portion, an adjustable portion and an opening formed on the adjustable portion, the adjustable portion is capable of going through the gap, and the opening is aligned with the through structure so that an inserted bolt of the bolt-type wiper arm in the through structure is securely retained in the connector body by the retaining plate.

2. The wiper connector according to claim 1, wherein each of the two sides of the fastening portion has a protrusion incapable of passing the gap.

3. The wiper connector according to claim 2, wherein the adjustable portion slantingly extends from the fastening portion to form an obtuse angle between the adjustable portion and the fastening portion.

4. The wiper connector according to claim 3, wherein the retaining plate is a flexible plate with an opening formed therein.

* * * * *